United States Patent
Opos

(10) Patent No.: US 12,101,352 B1
(45) Date of Patent: Sep. 24, 2024

(54) IDENTIFYING AND PROTECTING AGAINST MALICIOUS ELECTRONIC MESSAGES THAT DECEPTIVELY APPEAR TO ORIGINATE FROM A TRUSTED SOURCE

(71) Applicant: NortonLifeLock Inc., Tempe, AZ (US)

(72) Inventor: Joshua M. Opos, Studio City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 406 days.

(21) Appl. No.: 17/368,347

(22) Filed: Jul. 6, 2021

(51) Int. Cl.
H04L 9/40 (2022.01)
H04L 51/58 (2022.01)
H04W 4/14 (2009.01)

(52) U.S. Cl.
CPC .......... *H04L 63/1483* (2013.01); *H04L 51/58* (2022.05); *H04L 63/1416* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 2015/0156210 A1* | 6/2015 | Hunt | | H04L 63/1408 726/23 |
| 2016/0135020 A1* | 5/2016 | Moshir | | H04L 51/58 455/466 |
| 2018/0101598 A1* | 4/2018 | Allen | | G06F 40/268 |
| 2022/0141252 A1* | 5/2022 | Shi | | H04L 63/102 726/22 |
| 2022/0309516 A1* | 9/2022 | Rhoads | | G06N 20/00 |

OTHER PUBLICATIONS

Sadeghi, A., Bagheri, H., Garcia, J. and Malek, S., 2016. A taxonomy and qualitative comparison of program analysis techniques for security assessment of android software. IEEE Transactions on Software Engineering, 43(6), pp. 492-530. (Year: 2016).*
Xu, W., Tian, J., Cao, Y. and Wang, S., 2017. Challenge-response authentication using in-air handwriting style verification. IEEE Transactions on Dependable and Secure Computing, 17(1), pp. 51-64. (Year: 2017).*
Symantec; "Symantec Endpoint Protection Mobile—Mobile Threat Defense for Modern Operating Systems"; Data Sheet; 2019; located at: https://docs.broadcom.com/doc/endpoint-protection-mobile-en; 2 pages.

* cited by examiner

*Primary Examiner* — Luu T Pham
*Assistant Examiner* — Edward X Long
(74) *Attorney, Agent, or Firm* — MASCHOFF BRENNAN

(57) ABSTRACT

Identifying and protecting against malicious electronic messages that deceptively appear to originate from a trusted source. An authentic writing style contained within a legitimate electronic message that originates from a vender may be identified. The authentic writing style may be stored in a database. A new electronic message may be received that appears to originate from the vendor. The new electronic message may contain a new writing style. The new writing style may be compared with the authentic writing style stored in the database to identify any differences between the new writing style and the authentic writing style. A determination may be made that the new electronic message does not originate from the vender based, at least on part, on one or more differences identified between the writing styles. A security action may then be performed to protect against the new electronic message.

14 Claims, 3 Drawing Sheets

IDENTIFYING AND PROTECTING AGAINST MALICIOUS ELECTRONIC MESSAGES THAT DECEPTIVELY APPEAR TO ORIGINATE FROM A TRUSTED SOURCE

BACKGROUND

Electronic messages may be sent and received in a wide variety of forms. Some electronic messages are sent over the Internet, such as emails and messages sent through a downloaded and installed messaging application. Electronic messages may also be sent over a cellular network, such as short message service (SMS) messages and multimedia messaging service (MMS) messages. Electronic messages are often used by commercial vendors to communicate information, such as offers, notifications, and updates, to customers.

Electronic messages, however, are susceptible to a number of security issues. For example, "spoofing" is the act of disguising an electronic message from an unknown and often malicious source as being from a known and trusted source. Thus, a recipient of a spoofed electronic message may believe that the communication originates from a trusted vender based on an identification of a source of the message, when, in fact the message does not originate from that vender. Spoofing and other security attacks that involve electronic messages can be used to gain access to a target's personal information, spread malware through infected links or attachments, bypass network access controls, or redistribute traffic to conduct denial-of-service attacks.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for identifying and protecting against malicious electronic messages that deceptively appear to originate from a trusted source may be performed, at least a portion of the method being performed by a computing device comprising one or more processors. The method may include identifying an authentic writing style contained within a legitimate electronic message that originates from a vender, the legitimate electronic message being used by the vender to communicate with customers, storing the authentic writing style in a database, receiving a new electronic message that appears to originate from the vender, the new electronic message containing a new writing style, comparing the new writing style contained within the new electronic message with the authentic writing style stored in the database to identify any differences between the new writing style and the authentic writing style, determining that the new electronic message does not originate from the vender based, at least in part, on one or more differences identified between the new writing style and the authentic writing style, and protecting against the new electronic message by performing a security action.

In some embodiments, the security action may be to modify the new electronic message to include a notification that the electronic message does not originate from the vender or to block delivery of the new electronic message from reaching an intended recipient. In embodiments where the new electronic message includes a selectable link, the security action may be to disable the link so that it cannot be selected by an intended recipient.

In some embodiments, the authentic writing style may include standard language that is routinely used by the vender in communications with customers.

In some embodiments, the new electronic message may be a text message that is received over a cellular network and the text message may appear to originate from a number that is associated with the vender. In these embodiments, the text message may appear within a chain that includes the legitimate electronic message.

In some embodiments, the one or more differences identified between the new writing style and the authentic writing style includes a use of different words, a different spelling of a word, a different sequence of words, or a different use of punctuation.

Also, in some embodiments, one or more non-transitory computer-readable media may comprise one or more computer-readable instructions that, when executed by one or more processors of a security device, cause the security device to perform a method for identifying and protecting against malicious electronic messages that deceptively appear to originate from a trusted source.

Also, in some embodiments, a computing device comprising one or more processors and one or more non-transitory computer-readable media comprising one or more computer-readable instructions that, when executed by the one or more processors, may cause the computing device to perform a method for identifying and protecting against malicious electronic messages that deceptively appear to originate from a trusted source.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
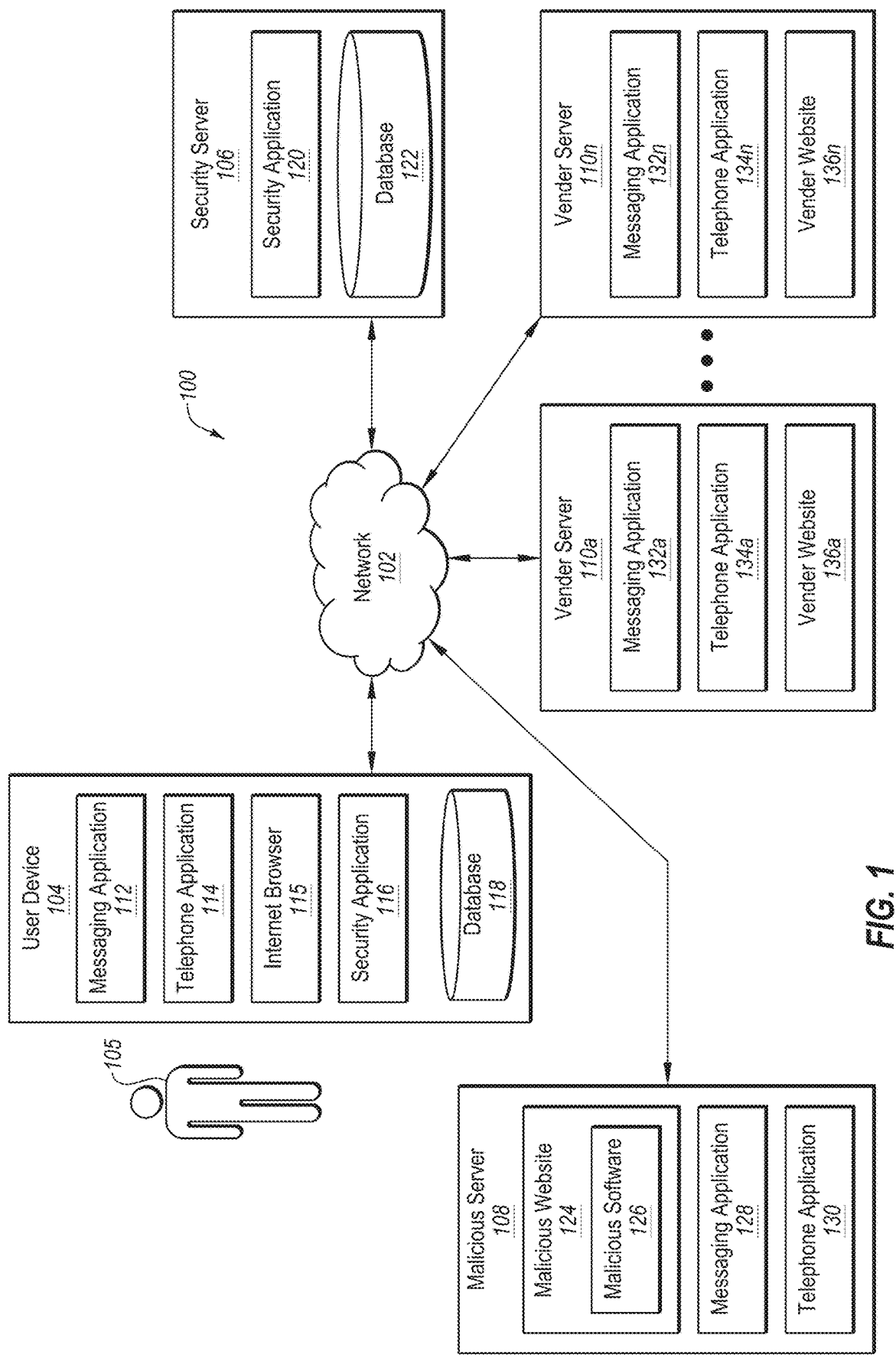
FIG. 1 illustrates an example system configured for identifying and protecting against malicious electronic messages that deceptively appear to originate from a trusted source.

Electronic messages have become a common way to send and receive information. Some electronic messages may be limited to alphanumeric characters and other symbols, while other electronic messages may include links to web pages, pictures, videos, etc. Networks are often used to send and receive electronic messages. For example, wide area networks, such as the Internet, are used to send and receive emails as well as communications that are sent through one of a variety of downloadable messaging applications. Cellular networks are also used to send and receive electronic messages. Electronic messages sent and received over a cellular network, such as short message service (SMS) messages and multimedia messaging service (MMS) messages, are often referred to as "text messages."

Electronic messages, however, are susceptible to a number of security issues. For example, "spoofing" is the act of disguising an electronic message from an unknown and often malicious source as being from a known, trusted source. Thus, a recipient of a spoofed electronic communication may believe that the communication originates from a trusted vender based on an identification of a source of the message, when, in fact the message does not originate from that vender. Spoofing can be especially difficult to detect when the deceptive electronic message appears within a message chain that includes authentic electronic messages.

Some venders use electronic messaging regularly to communicate information, such as offers, notifications, and updates, to customers. These electronic messages may include standard language that is routinely used by the vender in communications with its customers. For example, a package delivery company may send a text message to a customer providing a status of an upcoming delivery and a link to a webpage where the customer can track their package. The writing style (i.e., the words, symbols, font, punctuation, grammar, etc.) used to provide this update may be repeatedly used by the delivery company to update customers regarding the status of deliveries. Due to their heavy usage of electronic messaging and the repeated, and thus somewhat predictable, writing style contained in the messages, these venders are common targets for spoofing and other security attacks that involve electronic messaging.

The term "writing style," as used herein, includes any aspect of the content of an electronic message or how the electronic message is written. For example, a writing style may include the letters, numbers, or other symbols used in an electronic message and the sequence of these letters, numbers, or other symbols. A writing style may include the words used in an electronic message, the sequence of these words, how the words are spelled, and whether any words are misspelled. The spelling of some words differs from country to country. For example, "color" is used in the United States while "colour" is used in many other countries. A writing style may include the punctuation and grammar used in the electronic message. A writing style may include the font style, font size, font color, as well as font characteristics, such as underlining, bolding, and italicizing. A writing style may include a spacing between characters or words or between rows of characters or words in an electronic message.

If successful, spoofing and other security attacks that involve electronic messaging can enable an attacker to gain access to a target's personal information, spread malware to the target's device through infected links or attachments, bypass network access controls, or redistribute traffic to conduct denial-of-service attacks. These attacks may also be used to execute a larger cyber attack such as an advanced persistent threat or a man-in-the-middle attack.

Some embodiments disclosed herein may enable identifying and protecting against malicious electronic messages that deceptively appear to originate from a trusted source. For example, an authentic writing style contained within one or more legitimate electronic messages that originate from a vender may be identified. The vender may use these legitimate electronic messages to communicate with customers. This authentic writing style may be stored in a database. A new electronic message may be received that appears to originate from the vendor. The new electronic message may also contain a new writing style. The new writing style contained within the new electronic message may be compared with the authentic writing style stored in the database to identify any differences between the new writing style and the authentic writing style. A determination may be made that the new electronic message does not originate from the vender. This determination may be based, at least on part, on one or more differences identified between the new writing style and the authentic writing style. A security action may then be performed to protect against the new electronic message.

In this manner, electronic communications may be analyzed before they are delivered to an intended recipient. If an electronic message is determined to be deceptive, and not originate from the apparent source, a security action may be performed to protect against the new electronic message.

Turning to the figures, FIG. 1 illustrates an example system 100 configured for identifying and protecting against malicious electronic messages that deceptively appear to originate from a trusted source. The system 100 may include a network 102, a user device 104 and associated user 105, a security server 106, a malicious server 108, and vender servers 110*a*-110*n*.

In some embodiments, the network 102 may be configured to communicatively couple the user device 104, the security server 106, the malicious server 108, and the vender servers 110*a*-110*n*. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 3:
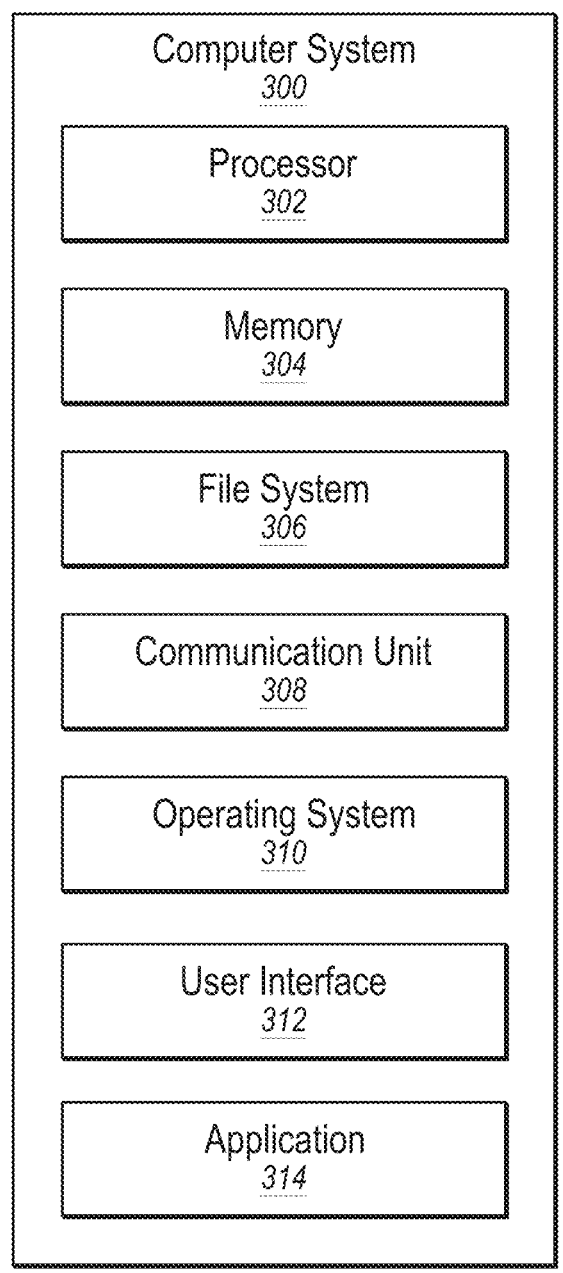
FIG. 3 illustrates an example computer system that may be employed in identifying and protecting against malicious electronic messages that deceptively appear to originate from a trusted source.

In some embodiments, the user device 104 may be any computer system capable of sending and receiving electronic messages over the network 102, examples of which are disclosed herein in connection with the computer system 300 of FIG. 3. In some embodiments, the user device 104 may include a messaging application 112. The messaging application 112 may enable the user 105 to send and receive messages over the network 102. In some embodiments, the messaging application 112 may be configured to use a wide area network, such as the Internet, to send and receive electronic messages. For example, emails may be sent and received over a wide area network. In other embodiments, the messaging application 112 may be configured to use a cellular network to send and receive electronic messages. For example, text messages including SMS and MMS messages may be sent and received over a cellular network.

In some embodiments, the messaging application 112 may send electronic messages to and receive electronic messages from any number of different servers that are connected to the network 102. For example, the user 105 may use the messaging application 112 to send messages to and receive messages from the malicious server 108 and the vender servers 110*a*-110*n*. In some embodiments, the user device 104 may also include a telephone application 114. The telephone application 114 may enable the user 105 to make and receive telephone calls over the network 102. Like the messaging application 112, the telephone application 114 may use a wide area network, such as the Internet, or a cellular network to make and receive telephone calls.

In some embodiments, the user device 104 may also include an Internet browser 115. The Internet browser 115 may enable the user 105 to access websites over the network 102. In some embodiments, the user device 104 may also include a security application 116. As described in more detail in connection with FIG. 2, the security application 116 may be configured to identify and protect against malicious electronic messages that deceptively appear to originate from a trusted source. Finally, in some embodiments, the user device 104 may include a database 118.

In some embodiments, the security server 106 may be any computer system capable of communicating over the network 102, examples of which are disclosed herein in connection with the computer system 300 of FIG. 3. In some embodiments, the security server 106 may include a security application 120. As described in more detail in connection with FIG. 2, the security application 120 may be configured to identify and protect against malicious electronic messages that deceptively appear to originate from a trusted source. In some embodiments, the security server 106 may include a database 122.

In some embodiments, the malicious server 108 may be any computer system capable of communicating over the network 102, examples of which are disclosed herein in connection with the computer system 300 of FIG. 3. The malicious server 108 may include a malicious website 124, which includes malicious software 126. The user 105 may use the Internet browser 115 to access the malicious website 124. In some embodiments, the malicious server 108 may include a messaging application 128. The user 105 may use the messaging application 112 to send electronic messages to and receive electronic messages from the messaging application 128. In some embodiments, the malicious server 108 may include a telephone application 130. The user 105 may use the telephone application 114 to make telephone calls to and receive telephone calls from the telephone application 130.

In some embodiments, the vender servers 110a-110n may be any computer system capable of communicating over the network 102, examples of which are disclosed herein in connection with the computer system 300 of FIG. 3. In some embodiments, the vender servers 110a-110n may include messaging applications 132a-132n. The user 105 may use the messaging application 112 to send electronic messages to and receive electronic messages from the messaging applications 132a-132n. In some embodiments, the vender servers 110a-110n may include telephone applications 134a-134n. The user 105 may use the telephone application 114 to make telephone calls to and receive telephone calls from the telephone applications 134a-134n. Finally, in some embodiments, the vender servers 110a-110n may include websites 136a-136n. The user 105 may use the Internet browser 115 to access the vender websites 136a-136n.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
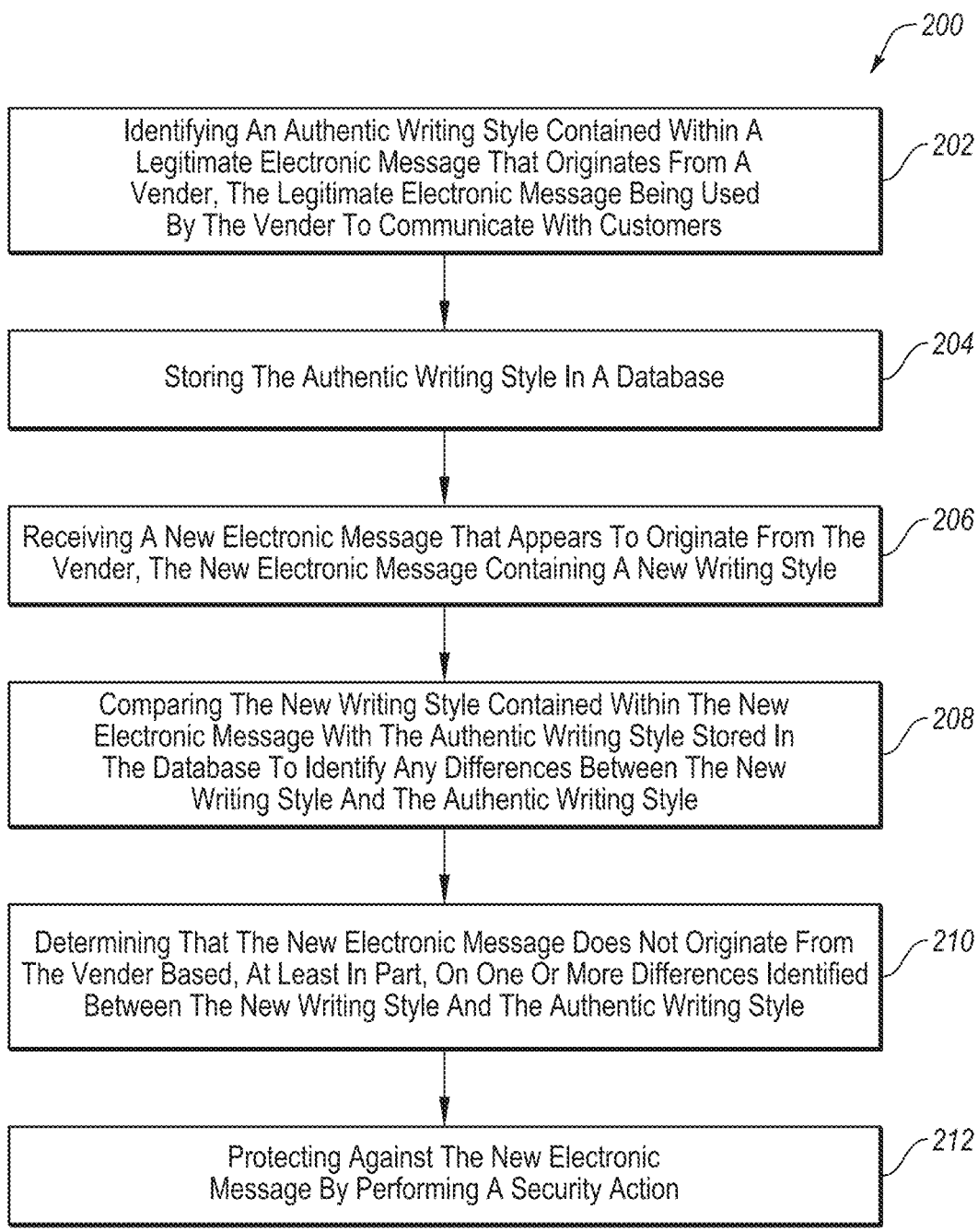
FIG. 2 is a flowchart of an example method for identifying and protecting against malicious electronic messages that deceptively appear to originate from a trusted source.

FIG. 2 is a flowchart of an example method 200 for identifying and protecting against malicious electronic messages that deceptively appear to originate from a trusted source. The method 200 may be performed in some embodiments, by a device or system, such as by the security application 116 and/or 120 of FIG. 1. In these and other embodiments, the method 200 may be performed by one or more processors based on one or more computer-readable instructions stored on one or more non-transitory computer-readable media. The method 200 will now be described in connection with FIG. 1.

The method 200 may include, at action 202, identifying an authentic writing style contained within a legitimate electronic message that originates from a vender, the legitimate electronic message being used by the vender to communicate with customers. For example, the vender servers 110a-110n in FIG. 1 may generate and send out this legitimate electronic message through their messaging applications 132a-132n. A user, for example the user 105, may receive one or more of these legitimate electronic messages through the messaging application 112.

In some embodiments, a security application may identify an authentic writing style contained within the legitimate electronic message. In one embodiment, the security application may be on a user device where electronic messages are sent and received, such as the security application 116 in FIG. 1. Alternatively, the security application may be remote from the user device, such as the security application 120 in FIG. 1.

The security application may receive the legitimate electronic message in any number of different ways. In some embodiments, the security application may receive one or more legitimate electronic messages over time by monitoring the electronic messages that venders, such as the venders associated with vender servers 110a-110n, send out. Alternatively, the security application may receive directly, from one or more venders, examples of one or more legitimate electronic messages that the venders send out. These legitimate electronic messages may include standard language that is routinely used by the vender in communications with customers.

Once received, the security application may evaluate these legitimate electronic messages and identify an authentic writing style contained within these legitimate electronic messages. The authentic writing style may be based on a single legitimate electronic message or it may be based on a plurality of legitimate electronic messages from the same vender.

The authentic writing style may be based on any aspect of the content of the legitimate electronic message or how the legitimate electronic message is written. For example, the authentic writing style may be based on the letters, numbers, or other symbols used in the legitimate electronic message and the sequence of these letters, numbers, or other symbols. The authentic writing style may be based on the words used in the legitimate electronic message, the sequence of these words, how the words are spelled, and whether any words are misspelled. The authentic writing style may be based on the punctuation and grammar used in the legitimate electronic message. The authentic writing style may include the font style, font size, font color, as well as font characteristics, such as underlining, bolding, and italicizing. The authentic writing style may be based on a spacing between characters or words or between rows of characters or words in the legitimate electronic message. Any number of different writing styles may also be identified by the security server.

In one embodiment, a writing style for a vender may be based on a single identified instance of use. Alternatively, the writing style may be based on a plurality of identified instances of use, either in a single legitimate electronic message or a plurality of legitimate electronic messages. In some embodiments, a confidence level may be assigned to each identified writing style. This confidence level may correspond to a number of instances of use identified for each writing style. For example, a writing style that has only a single identified instance of use may be assigned a relatively low confidence level, while a writing style that has multiple identified instances of use may be assigned a relatively higher confidence level.

As more authentic electronic messages are received, the security application may identify new writing styles and refine confidence levels assigned to previously identified writing styles. In one embodiment, the security server may use a machine learning algorithm to identify these writing styles and to refine the confidence levels assigned to previously identified writing styles.

The method 200 may include, at action 204, storing the authentic writing style in a database. In one embodiment, the database may be on a user device, such as the database 118 in FIG. 1. Alternatively, the database may be remote from the user device, such as the database 122 in security server 106. In addition to the authentic writing style, the legitimate electronic messages may also be stored in the database as well as the confidence levels assigned to each writing style identified.

The method 200 may include, at action 206, receiving a new electronic message that appears to originate from the vender, the new electronic message containing a new writing style. For example, the user 105 may receive a new electronic message through the messaging application 112. This new electronic message may appear to originate from one of the vender servers 110a-110n. In one embodiment, the new electronic message may be a text message that appears to originate from a number that is associated with the vender. For example, this number may be a telephone number or a short code number. In another embodiment, the new electronic message may be an email that appears to originate from an email address that is associated with the vender. The new electronic message may appear within a chain of electronic messages that include one or more legitimate electronic messages from the vender. For example, the new electronic message may appear in a text chain or an email chain that includes one or more legitimate electronic messages from the vender.

The new writing style contained within the new electronic message may include the same or similar types of writing styles identified in the legitimate electronic message. For example, the new writing style may be based on the letters, numbers, or other symbols used in the new electronic message and the sequence of these letters, numbers, or other symbols. The new writing style may be based on the words used in the new electronic message, the sequence of these words, how the words are spelled, and whether any words are misspelled. The new writing style may be based on the punctuation and grammar used in the new electronic message. The new writing style may include the font style, font size, font color, as well as font characteristics, such as underlining, bolding, and italicizing. The new writing style may be based on a spacing between characters or words or between rows of characters or words in the new electronic message. Any number of different writing styles may be identified by the security server.

In addition to a new writing style, the new electronic message may also include a link to a website or a phone number to call. In situations where the electronic message originates from an actual vender, these links may direct a user to a vender website, such as the vender websites 136a-136n. Similarly, a phone number on an electronic message that originates from an actual vender may connect the user with a telephone application of a vender, such as the telephone applications 134a-134n. However, if the new electronic message originates from a malicious source, such as malicious server 108, the link may direct a user to the malicious website 124 where malicious software 126 may be downloaded and installed on the user's computer. Similarly, a phone number in an electronic message that originates from a malicious source may connect a user to a telephone application associated with the malicious server 108, such as telephone application 130, where a user may be asked for sensitive information such as passwords, account details, and other sensitive information. In other embodiments, the new electronic message may request that the recipient send this sensitive information in a response to the message.

Regardless of how this information is provided, if it is obtained by a malicious entity, this information could be used to gain access to a user's personal information, spread malware through infected links or attachments, bypass network access controls, or redistribute traffic to conduct a denial-of-service attack. Thus, it is important to determine the actual source of new electronic messages before selecting (e.g., clicking on or tapping on) any links, calling any phone numbers, or otherwise responding with any information that may be requested.

The method 200 may include, at action 208, comparing the new writing style contained within the new electronic message with the authentic writing style stored in the database to identify any differences between the new writing style and the authentic writing style. In some embodiments, this comparison may be performed before the new electronic message is delivered to the intended recipient. For example, a new electronic message to user 105 may be intercepted by the security application 116 and/or 120, where differences between the new writing style and the authentic writing style may be identified, before the new electronic message is delivered to the user 105 through messaging application 112.

In some embodiments, the database may include authentic writing styles for a variety of different venders. In some embodiments, the new electronic message may be evaluated first to identify the vender from which the new electronic message appears to originate. This evaluation may be based on the apparent source of the electronic message, such as a number from which a text message originates or an email address from which an email originates. Once the apparent vender has been identified, the new writing style may then be compared to one or more authentic writing styles for the vender from which the new electronic message appears to originate.

The method 200 may include, at action 210, determining that the new electronic message does not originate from the vender based, at least in part, on one or more differences identified between the new writing style and the authentic writing style. In one embodiment, a certain number of differences between the new writing style and the authentic writing style must be identified before a determination is made that the new electronic message does not originate from the vender. For example, in some embodiments, more than 5 differences must be identified before a determination is made that the new electronic message does not originate from the vender. In other embodiments, a single identified difference between the new writing style and the authentic writing style may be sufficient to determine that the new electronic message does not originate from the vender. Alternatively, in some embodiments, a threshold level of certainty may be required before a determination is made that the new electronic message does not originate from the vender. The level of certainty may be based, at least in part, on a number of differences identified and the confidence level that is assigned to each authentic writing style that forms the basis of an identified difference with the new writing style.

Finally, the method 200 may include, at action 212, protecting against the new electronic message by performing a security action. For example, the security action may include modifying the new electronic message to include a notification that the electronic message does not originate from the vender. Alternatively, the security action may include disabling any selectable links contained within the new electronic message such that the links cannot be selected by an intended recipient of the new electronic message. Alternatively still, the security action may include blocking the delivery of the new electronic message from reaching the intended recipient.

The method 200 may thus be employed, in some embodiments, to identify and protect against malicious electronic messages that deceptively appear to originate from a trusted source. New electronic messages may be evaluated before they are delivered to a user. If it is determined that the new electronic message in fact originates from the vender, the new electronic message may be delivered without any modification. However, if it is determined that the new electronic messages does not originate from the vendor, a modified version of the new electronic message may be sent, or delivery of the new electronic message may be blocked altogether.

Although the actions of the method 200 are illustrated in FIG. 2 as discrete actions, various actions may be divided into additional actions, combined into fewer actions, reordered, expanded, or eliminated, depending on the desired implementation.

Further, it is understood that the method 200 may improve the functioning of a computer system itself. For example, the functioning of the user device 104 of FIG. 1 may itself be improved by the method 200. Indeed, by identifying malicious electronic messages and either modifying these electronic messages or blocking them, a user can avoid performing an action (e.g., selecting a link, calling a phone number, or otherwise responding to the message) that could compromise not only the security and proper functionality of the user device 104, but also the privacy of the user 105.

Also, the method 200 may improve the technical field of electronic messaging security. Identifying an authentic writing style and comparing that style to a writing style contained in a new electronic message provides an improvement over conventional messaging technology, which does not analyze new electronic messages in the ways described herein.

FIG. 3 illustrates an example computer system 300 that may be employed in identifying and protecting against malicious electronic messages that deceptively appear to originate from a trusted source. In some embodiments, the computer system 300 may be part of any of the systems or devices described in this disclosure. For example, the computer system 300 may be part of any of the user device 104, the security server 106, the malicious server 108, and the vender servers 110a-110n.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the methods disclosed herein.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the methods disclosed herein. These computer-executable instructions may be included, for example, in the operating system 310, in one or more applications, such as the messaging applications 112, 128, and 132a-132n, or the telephone applications 114, 130, and 134a-134n, or in the security applications 116 and 120, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more of the actions of the methods disclosed herein. In some embodiments, the application 314 may be part of the operating system 310 or may be part of an application of the computer system 300, or may be some combination thereof. In some embodiments, the application 314 may function as any one of the messaging applications 112, 128, and 132*a*-132*n*, or the telephone applications 114, 130, and 134*a*-134*n*, or in the security applications 116 and 120, or in some combination thereof.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against malicious electronic messages that deceptively appear to originate from a trusted source, at least a portion of the method being performed by a computing device comprising one or more processors, the computer-implemented method comprising:
 identifying an authentic writing style contained within one or more legitimate electronic messages that originate from a vender, the legitimate electronic messages being used by the vender to communicate with customers;
 assigning a confidence level to the authentic writing style, wherein the confidence level is assigned based at least in part on a number of times that the authentic writing style is identified in the one or more legitimate electronic messages;
 storing the authentic writing style in a database;
 receiving a new electronic message that appears to originate from the vender, the new electronic message containing a new writing style and a selectable link;
 comparing the new writing style contained within the new electronic message with the authentic writing style stored in the database to identify any differences between the new writing style and the authentic writing style;
 determining that the new electronic message does not originate from the vender based, at least in part, on one or more differences identified between the new writing style and the authentic writing style and the confidence level assigned to the authentic writing style; and
 protecting against the new electronic message by performing a security action, wherein the security action includes disabling the link so that it cannot be selected by an intended recipient.

2. The computer-implemented method of claim 1, wherein the security action further includes modifying the new electronic message to include a notification that the new electronic message does not originate from the vender.

3. The computer-implemented method of claim 1, wherein the authentic writing style includes standard language that is routinely used by the vender in communications with customers.

4. The computer-implemented method of claim 1, wherein the new electronic message is a text message that is received over a cellular network and the text message appears to originate from a number that is associated with the vender.

5. The computer-implemented method of claim 4, wherein the text message appears within a chain that includes the one or more legitimate electronic messages.

6. The computer-implemented method of claim 1, wherein the one or more differences identified between the new writing style and the authentic writing style includes a use of different words, a different spelling of a word, or a different sequence of words.

7. One or more non-transitory computer-readable media comprising one or more computer-readable instructions that, when executed by one or more processors of a security server, cause the security server to perform a method for identifying and protecting against malicious electronic messages that deceptively appear to originate from a trusted source, the method comprising:
 identifying an authentic writing style contained within one or more legitimate electronic messages that originate from a vender, the legitimate electronic messages being used by the vender to communicate with customers;
 assigning a confidence level to the authentic writing style, wherein the confidence level is assigned based at least in part on a number of times that the authentic writing style is identified in the one or more legitimate electronic messages;
 storing the authentic writing style in a database;
 receiving a new electronic message that appears to originate from the vender, the new electronic message containing a new writing style and a selectable link;
 comparing the new writing style contained within the new electronic message with the authentic writing style stored in the database to identify any differences between the new writing style and the authentic writing style;
 determining that the new electronic message does not originate from the vender based, at least in part, on one or more differences identified between the new writing style and the authentic writing style and the confidence level assigned to the authentic writing style; and
 protecting against the new electronic message by performing a security action, wherein the security action includes disabling the link so that it cannot be selected by an intended recipient.

8. The one or more non-transitory computer-readable media of claim 7, wherein the security action further includes modifying the new electronic message to include a notification that the new electronic message does not originate from the vender.

9. The one or more non-transitory computer-readable media of claim 7, wherein the authentic writing style includes standard language that is routinely used by the vender in communications with customers.

10. The one or more non-transitory computer-readable media of claim 7, wherein the new electronic message is a text message that is received over a cellular network and the text message appears to originate from a number that is associated with the vender.

11. The one or more non-transitory computer-readable media of claim 10, wherein the text message appears within a chain that includes the one or more legitimate electronic messages.

12. The one or more non-transitory computer-readable media of claim 7, wherein the one or more differences identified between the new writing style and the authentic writing style includes a use of different words, a different spelling of a word, or a different sequence of words.

13. A computing device comprising:
 one or more processors; and
 one or more non-transitory computer-readable media comprising one or more computer-readable instructions that, when executed by the one or more processors, cause the computing device to perform a method for identifying and protecting against malicious electronic messages that deceptively appear to originate from a trusted source, the method comprising:
  identifying an authentic writing style contained within one or more legitimate electronic messages that originate from a vender, the legitimate electronic messages being used by the vender to communicate with customers;
  assigning a confidence level to the authentic writing style, wherein the confidence level is assigned based at least in part on a number of times that the authentic writing style is identified in the one or more legitimate electronic messages;

storing the authentic writing style in a database;

receiving a new electronic message that appears to originate from the vender, the new electronic message containing a new writing style and a selectable link;

comparing the new writing style contained within the new electronic message with the authentic writing style stored in the database to identify any differences between the new writing style and the authentic writing style;

determining that the new electronic message does not originate from the vender based, at least in part, on one or more differences identified between the new writing style and the authentic writing style and the confidence level assigned to the authentic writing style; and protecting against the new electronic message by performing a security action, wherein the security action includes disabling the link so that it cannot be selected by an intended recipient.

14. The computing device of claim 13, wherein the security action is further includes modifying the new electronic message to include a notification that the new electronic message does not originate from the vender.

* * * * *